United States Patent [19]

Atsukawa et al.

[11] 4,067,707
[45] Jan. 10, 1978

[54] SPRAY TYPE WET SCRUBBER

[75] Inventors: Masumi Atsukawa; Atsushi Tatani, both of Hiroshima, Japan

[73] Assignee: Mitsubishi Jukogyo Kabushiki Kaisha, Tokyo, Japan

[21] Appl. No.: 693,481

[22] Filed: June 7, 1976

[30] Foreign Application Priority Data

June 12, 1975 Japan .................................. 50-70206

[51] Int. Cl.² ............................................. B01D 46/04
[52] U.S. Cl. ..................................... 55/242; 261/112; 261/116; 261/117
[58] Field of Search ....................... 55/242, 240, 241; 261/115–118, 112

[56] References Cited

U.S. PATENT DOCUMENTS

| 1,722,466 | 7/1929 | Hayes, Jr. | 261/117 |
| 2,284,317 | 5/1942 | Greenberg | 261/117 |
| 3,596,439 | 8/1971 | Moragne | 55/242 |
| 3,958,959 | 5/1976 | Cohen et al. | 261/117 |

FOREIGN PATENT DOCUMENTS

| 878,201 | 9/1961 | United Kingdom | 261/117 |

Primary Examiner—Bernard Nozick
Attorney, Agent, or Firm—George B. Oujevolk

[57] ABSTRACT

A spray type wet scrubber includes a plurality of spray nozzles installed in parallel banks across the path of gas stream within the scrubber body, and partition walls held upright in grating fashion to divide the path of gas stream into a plurality of passages, each of which accommodates one of the spray nozzles.

1 Claim, 7 Drawing Figures

SPRAY TYPE WET SCRUBBER

This invention relates to a spray type wet scrubber.

As means for cleaning dust-laden gases, wet scrubbers in the form of spray towers have been well known. Typical of such scrubbers, as shown in FIG. 1, comprises a scrubber body and a plurality of spray nozzles 2 installed therein in banks across the path of gas stream (indicated by arrows). In the arrangement shown, part of the gas stream will flow upward through the space uncovered by the atomized droplets of scrubbing liquid sprayed from the nozzles 2, making it impossible to achieve thorough contact between the gas and liquid. In order to correct this, it has been necessary to use an increased number of nozzles or increased quantity of liquid per unit scrubbing area so as to accomplish as complete a gas-liquid contact as possible. In addition, the conventional scrubbers require very large cross sectional areas since they have to treat gases at low superficial velocities of at most several meters per second in the scrubbers.

With the view to eliminating the afore-described drawbacks of the existing equipments, we have made intensive studies and have finally arrived at this invention.

It is therefore an object of the present invention to provide a scrubber free of the drawbacks of the conventional ones.

Another object of the invention is to provide a spray type wet scrubber which achieves a high gas-liquid contact efficiency and is remarkably effective in dust removal.

According to the invention, the wet scrubber is characterized in that a plurality of spray nozzles installed in parallel banks across the path of gas stream therein are separated from one another by partition walls which are equipped with a wash liquid feeder for cleaning the wall surfaces.

Understanding of the invention will be faciliteted by reference to the accompanying drawings, in which.

Figure 1:
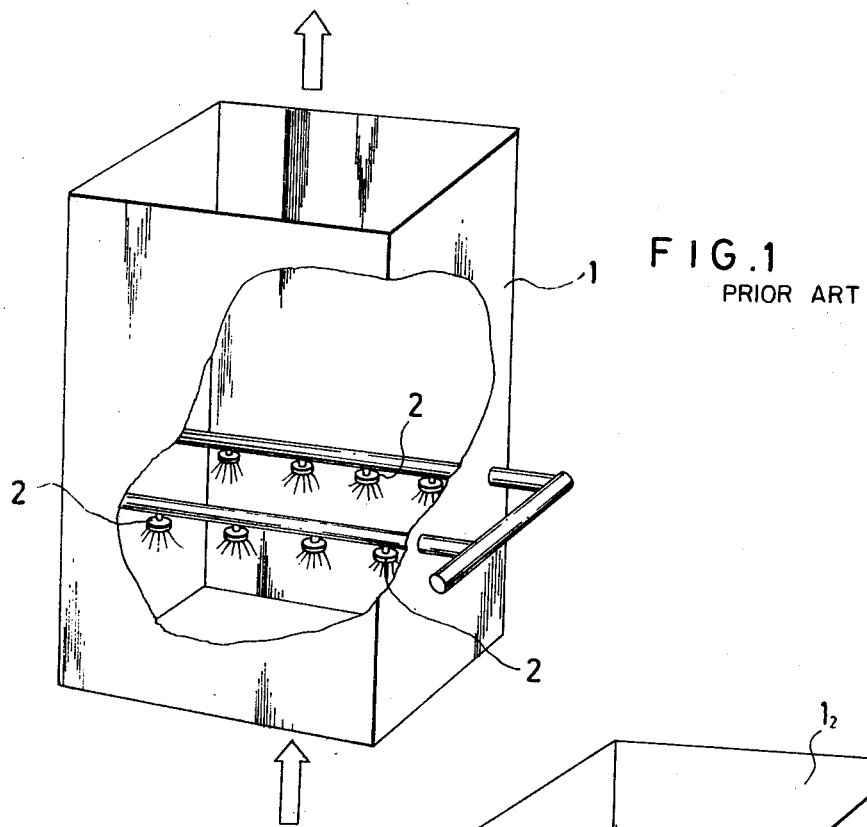
FIG. 1 is a perspective view of an ordinary spray type wet scrubber, partly broken away to show the interior construction.
Figure 2:
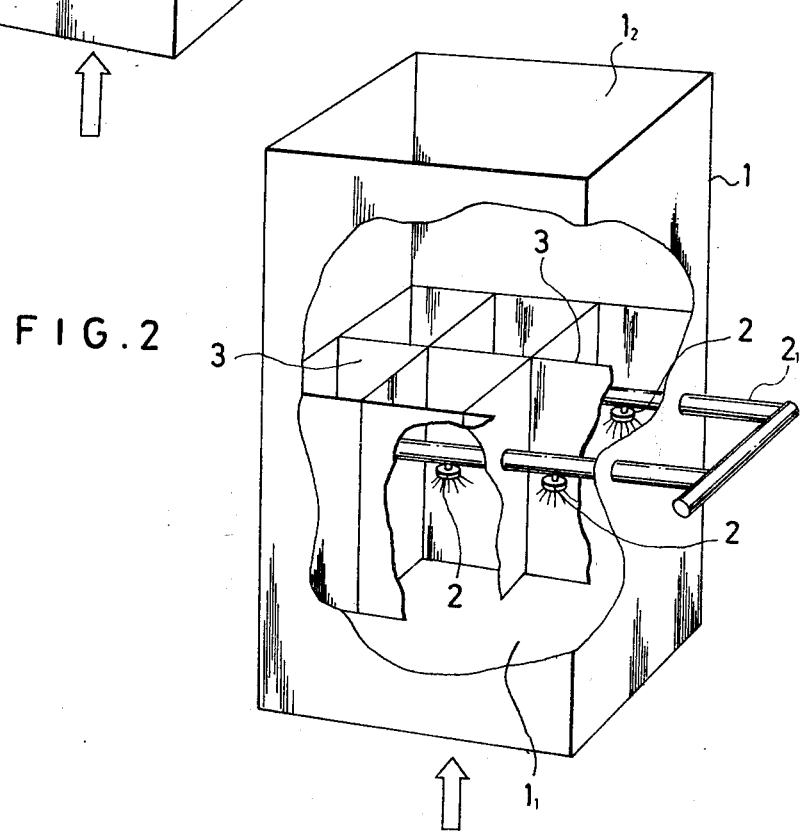
FIG. 2 is a perspective view of a wet scrubber embodying the present invention, partly broken away to show the interior construction.

Referring now to FIG. 2, there is shown a scrubber body 1 having an inlet $1_1$ and an outlet $1_2$. Inside the body 1 are installed a plurality of spray nozzles 2 in two banks across the path of gas stream (indicated by an arrow). The nozzles are suspended from scrubbing liquid pipes $2_1$. Partition walls 3 are arranged like a grating substantially in parallel with the direction of gas flow so as to divide the path of gas stream into a plurality of passages. At least one nozzle 2 is allotted to each passage, and the gas stream is allowed to flow in the arrow-marked direction through these passages. The partition walls shown are partly broken away by way of illustration.

To summarize the operation the scrubbing liquid is supplied through the pipes $2_1$ to the spray nozzles 2 and is sprayed downward, while the dust-laden gas flows upward as indicated by the arrow. Surrounded by the partition walls 3, the droplets of spray from each nozzle 2 will be kept out of contact with those of any adjacent nozzle. The droplets impinge almost uniformly upon the surrounding surfaces of partition walls 3, thus accomplishing thorough contact with the branched gas stream.

Figure 6:
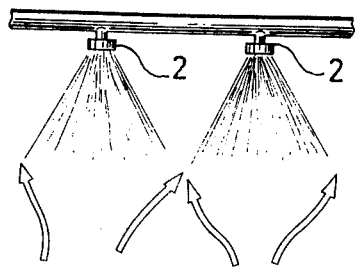
FIG. 6 is a view to illustrate a phenomenon of gas blow-through in the case of no provision of partition walls.

As illustrated in FIG. 6, in cases where no partition walls are provided, there occurs a small density of liquid droplets at a place somewhat separated from the nozzles. Since gas stream (shown by arrow) is subjected to little resistance at such place of small density of liquid droplets, it is liable to converge thereon insomuch that the velocity of gas stream becomes locally large and then gas is sure to blow therethrough. Because of this phenomenon, the effect of contact between gas and liquid will be reduced.

Figure 7:
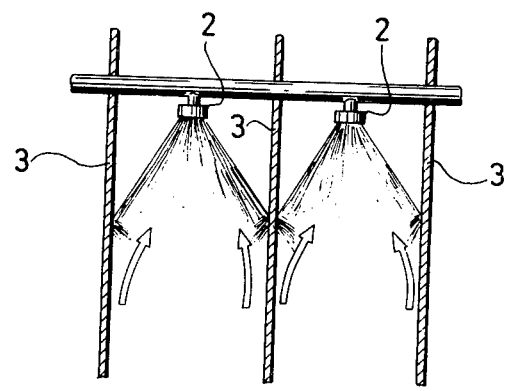
FIG. 7 is a view to illustrate the prevention of phenomenon of gas blow-through by means of partition walls.

In contrast, according to the present invention with the provision of partition walls, as shown in FIG. 7, liquid impinging upon the partition walls is dispersed inwardly so that the density of liquid droplets can be maintained at a high level at every part. Accordingly, there occurs no phenomenon of gas blow-through.

At the same time also in the case of no partition walls being provided when gas velocity is accelerated, it leads to the furtherance of gas blow-through phenomen until the effect of contact between gas and liquid is reduced. In contrast, if partition walls are installed, the dispersion of liquid impinging upon them will be furthered by dint of highly accelerated gas stream so as to increase the effect of contact between gas and liquid more and more.

Figure 3:
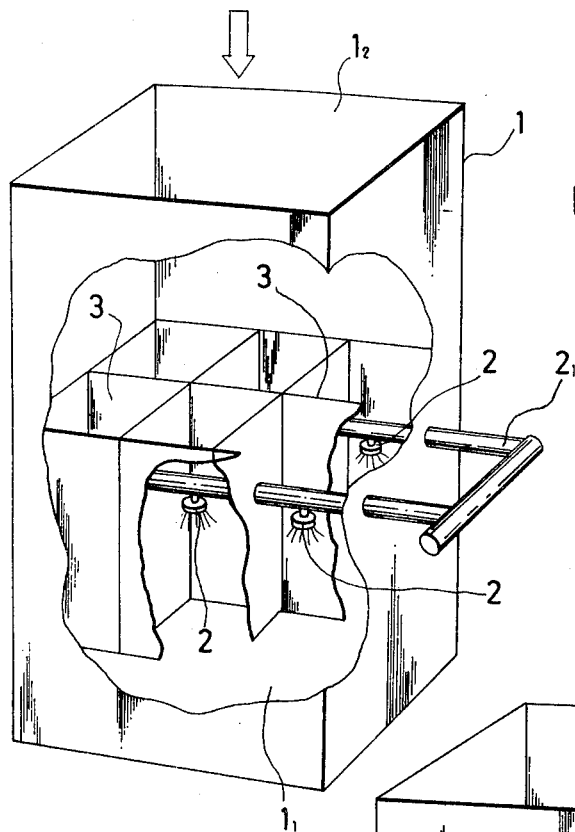
FIGS. 3 and 4 are views similar to FIG. 2 but showing other embodiments of the invention.

While the scrubber shown in FIG. 2 is operated with the gas and liquid fed in counter flows, the second embodiment in FIG. 3 is of a parallel flow design. Except for the direction of gas flow, the construction of the latter is the same as that of the first embodiment, and the numerals used to designate the parts in FIG. 2 are applicable to like parts in FIG. 3.

Figure 4:
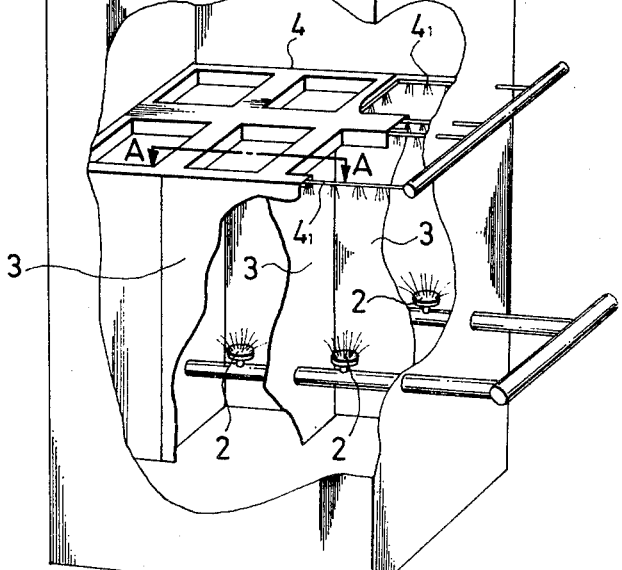

FIG. 4 illustrates another embodiment of the invention in which the scrubber with partition walls is further provided with a wash liquid feeder for cleaning the partition wall surfaces. In the same manner as with the embodiments in FIGS. 2 and 3, the scrubber body 1 includes a plurality of spray nozzles 2 installed in banks across the path of gas stream (indicated by arrows), and partition walls 3 dividing the path of gas stream into a plurality of passages, each accommodating one of the nozzles. This embodiment differs, however, from the preceding embodiments in that the nozzles 2 are arranged to spray the scrubbing liquid in the direction against the force of gravity and that a wash liquid feeder 4 is mounted on top of the partition walls 3 to wash the wall surfaces.

Figure 5:
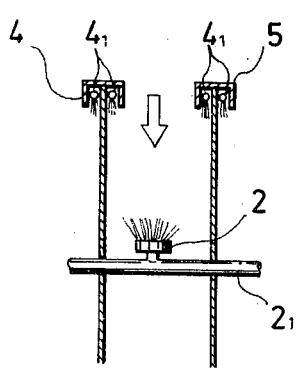
FIG. 5 is a fragmentary cross sectional view taken along the line A—A of FIG. 4.

FIG. 5, which is a fragmentary section taken along the line A—A of FIG. 4, clarifies how the gas stream (indicated by an arrow) is directed counter to the atomized spray from a nozzle. It also shows in detail the feeder 4 of wash liquid for cleaning the partition wall surfaces.

As shown, the wash liquid feeder 4 comprises feed pipes $4_1$ in pairs, each pipe being formed with a number of spray orifices on the underside, held along the upper end of a partition wall or along the inner wall of the scrubber body 1. Covers 5 are provided, each covering each pair of the feed pipes $4_1$ in a grid formation over the partition walls.

The counter-flow design shown in FIGS. 4 and 5 enhances the beneficial function of the partition walls used in the embodiment of FIGS. 2 and 3. Also, in the embodiment of FIGS. 4 and 5, the wash liquid feeder 4 mounted on the partition walls 3 protect the wall surfaces against deposition of particulates from the descending gas stream. The dust deposit, if any, can be immediately washed away. In this embodiment the height of the partition walls 3 is set to a level above the height the droplets produced by the spray nozzles 2 can rise to in the absence of the gas to be treated. The areas of the partition wall surfaces beyond the reach of the droplets from the spray are continuously wetted with the wash liquid from the upper ends of the partition walls.

With the construction described, the scrubber according to this invention effects a high degree of gas-liquid contact and achieves an extremely good dust collection efficiency through the impingement of the droplets from the spray nozzles upon the partition wall surfaces. Even when operating with a superficial velocity of the gas stream as high as several 10 meters per second in the scrubber body, satisfactory gas-liquid contact will be accomplished. Consequently, the scrubber can be compact and small, less than about one-tenth the size of ordinary equipment. Another advantage is that the impingement of the droplets from the spray upon the surrounding partition walls ensures all the more effective gas-liquid contact and hence less consumption of the scrubbing liquid than with the conventional scrubbers. In addition, as shown in FIGS. 4 and 5, the liquid from the nozzles can be sprayed against the direction in which the force of gravity acts and also counter to the gas stream, whereby the beneficial effect of the partition walls is further improved and the gas-liquid contact is adequately carried out even at low liquid-gas ratios. Further, the partition walls are washable to avoid dust deposition on the wall surfaces.

What is claimed is:

1. In a spray type wet scrubber apparatus including an elongated vertical housing (1) with a top end, center section, and bottom end, a gas inlet at one of said ends, a gas outlet at the other of said ends, a plurality of parallel scrubbing liquid pipes ($2_1$) horizontally disposed across said center section and a plurality of spray nozzles (2) extending from said pipes ($2_1$), said housing having two sets of partition walls (3) each set having a plurality of parallel walls, the walls in the one set being at right angles to those in the other set so as to form a plurality of separate chambers with at least one nozzle (2) being allocated to each chamber, so that a dust laden gas stream flows across said chambers from said inlet to said outlet said spray nozzles (2) spraying a scrubbing liquid onto the moving dust laden gas forming dust laden drops which inpinge on the surrounding surfaces of the partition walls; the improvement therein consisting of having said gas inlet at the top end, the gas outlet at the bottom end, said spray nozzles being so disposed as to spray upwards and a plurality of wash liquid feeders means (4) comprising a wall top flange cover (5) at the top of each partition wall with feeder pipes (4) within said cover flanges alongside the top of each wall with a plurality of spray orifices at the underside thereof to spray wash liquid down the walls.

* * * * *